US012587110B2

(12) United States Patent
Shuai et al.

(10) Patent No.: US 12,587,110 B2
(45) Date of Patent: Mar. 24, 2026

(54) QUASI THREE-LEVEL POWER CONVERTER

(71) Applicant: HUAWEI TECHNOLOGIES CO., LTD., Shenzhen (CN)

(72) Inventors: Peng Shuai, Shenzhen (CN); Chengmin Li, Lausanne (CH); Drazen Dujic, Lausanne (CH)

(73) Assignee: Huawei Technologies Co., Ltd., Shenzhen (CN)

( * ) Notice: Subject to any disclaimer, the term of this patent is extended or adjusted under 35 U.S.C. 154(b) by 177 days.

(21) Appl. No.: 18/506,792

(22) Filed: Nov. 10, 2023

(65) Prior Publication Data

US 2024/0079966 A1     Mar. 7, 2024

Related U.S. Application Data

(63) Continuation of application No. PCT/EP2021/062659, filed on May 12, 2021.

(51) Int. Cl.
*H02M 7/483* (2007.01)
*H02M 1/00* (2006.01)
*H02M 7/487* (2007.01)
*H02M 7/5395* (2006.01)

(52) U.S. Cl.
CPC ....... *H02M 7/4835* (2021.05); *H02M 1/0029* (2021.05); *H02M 1/0095* (2021.05); *H02M 7/487* (2013.01); *H02M 7/5395* (2013.01)

(58) Field of Classification Search
CPC ............. H02M 7/4835; H02M 1/0029; H02M 1/0095; H02M 7/487; H02M 7/5395
See application file for complete search history.

(56) References Cited

U.S. PATENT DOCUMENTS

| | | | |
|---|---|---|---|
| 9,641,098 B2 * | 5/2017 | Fu ...................... | H02M 7/4837 |
| 2014/0254228 A1 | 9/2014 | Ying et al. | |
| 2017/0257022 A1 | 9/2017 | Bryant | |

(Continued)

FOREIGN PATENT DOCUMENTS

| | | |
|---|---|---|
| CA | 2827664 A1 | 3/2014 |
| CN | 112152464 A | 12/2020 |
| SE | 1951506 A1 | 1/2020 |

(Continued)

OTHER PUBLICATIONS

Adam et al., "Review of dc-dc converters for multi-terminal HVDC transmission networks", IET Power Electronics, vol. 9, No. 2, pp. 281-296 (Feb. 10, 2016).

(Continued)

*Primary Examiner* — Adolf D Berhane
(74) *Attorney, Agent, or Firm* — Leydig, Voit & Mayer, Ltd.

(57) ABSTRACT

The present disclosure provides a power converter, comprising: a positive terminal, a neutral terminal, a negative terminal, a first intermediate node, a second intermediate node, and an AC terminal. Vertical and horizontal switches are configured to switch a DC voltage between the positive and negative terminal to an AC voltage at the AC terminal. The AC voltage comprises three main voltage levels. A transition between any two of the main voltage levels follow a trapezoidal shape with at least one voltage sub-level.

20 Claims, 7 Drawing Sheets

(56) References Cited

U.S. PATENT DOCUMENTS

| | | | |
|---|---|---|---|
| 2019/0115840 A1 | 4/2019 | Li et al. | |
| 2025/0015717 A1* | 1/2025 | Zeng | H02M 3/1584 |

FOREIGN PATENT DOCUMENTS

| | | |
|---|---|---|
| WO | 2017021169 A1 | 2/2017 |
| WO | 2019238443 A1 | 12/2019 |

OTHER PUBLICATIONS

Bertoldi et al., "Quasi-Two-Level converter operation strategy for overvoltage mitigation in long cable applications", IEEE International Electric Machines & Drives Conference (IEMDC), pp. 1621-1627 (May 12, 2019).

Gowaid et al., "Analysis and Design of a Modular Multilevel Converter with Trapezoidal Modulation for Medium and High Voltage DC-DC Transformers", IEEE Transactions on Power Electronics, vol. 30, No. 10, total 19 pages (Oct. 1, 2015).

Mertens et al., "Quasi Two-Level PWM Operation of an MMC Phase Leg with Reduced Module Capacitance," IEEE Transactions on Power Electronics, vol. 31, No. 10, Total 5 pages (Oct. 2016).

Gowaid et al., "Quasi two-level operation of modular multilevel converter for use in a high-power DC transformer with DC fault isolation capability," IEEE Transactions on Power Electronics, vol. 30, No. 1, Total 17 pages (Jan. 2015).

Milovanovic et al., "Comprehensive Analysis and Design of a Quasi Two-Level Converter Leg," CPSS Transactions on Power Electronics and Applications, vol. 4 No. 3, Total 17 pages (Sep. 2019).

Li et al., "Space Vector Modulation for SiC and Si Hybrid ANPC Converter in Medium-Voltage High-Speed Drive System," IEEE Transactions on Power Electronics, vol. 35, No. 4, Total 12 pages (Apr. 2020).

Adam et al., "Capacitor balance issues of the diode-clamped multilevel inverter operated in a quasi two-state mode," IEEE Transactions on Industrial Electronics, vol. 55, No. 8, Total 12 pages (Aug. 2008).

Sinha Akanksha et al., "An inclusive review on different multilevel inverter topologies, their modulation and control strategies for a grid connected photo-voltaic system," Solar Energy, Elsevier, Amsterdam, NL, vol. 170, Total 25 pages (Jun. 22, 2018).

Naderi Roozbeh et al., "Dual Flying Capacitor Active-NeutralPoint-Clamped Multilevel Converter," IEEE Transactions On Power Electronics, Institute of Electrical and Electronics Engineers, USA, vol. 31, No. 9, Total 9 pages (Sep. 1, 2016).

* cited by examiner

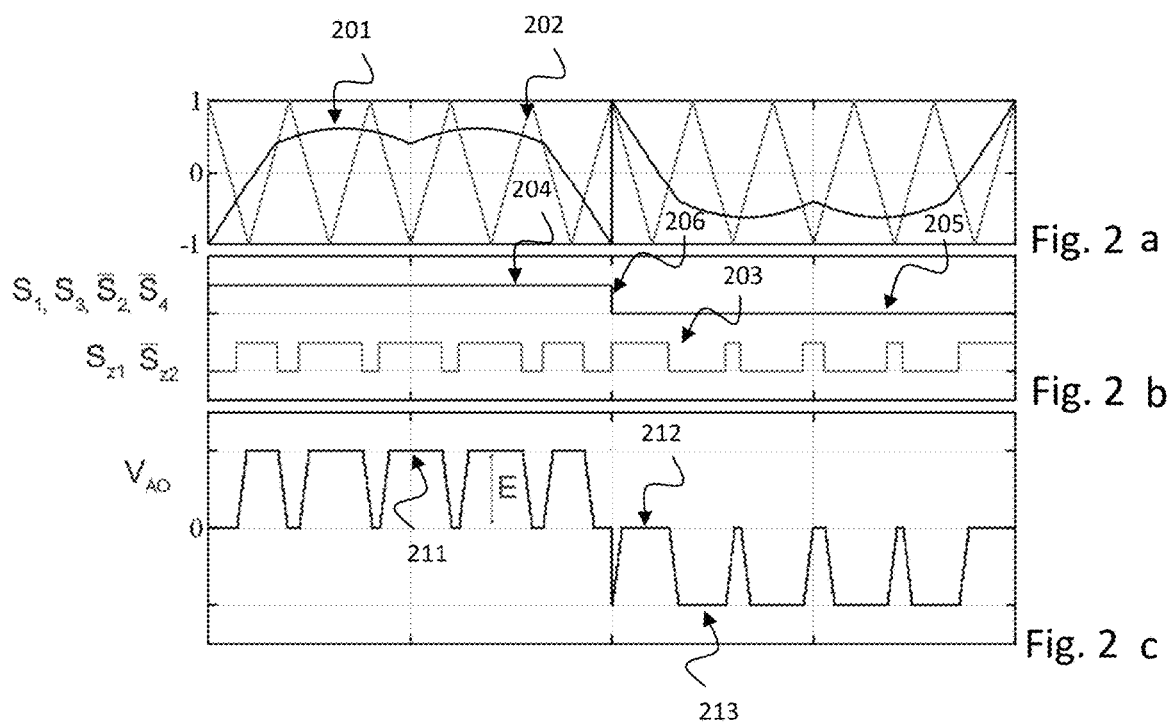
Fig. 2 a
Fig. 2 b
Fig. 2 c

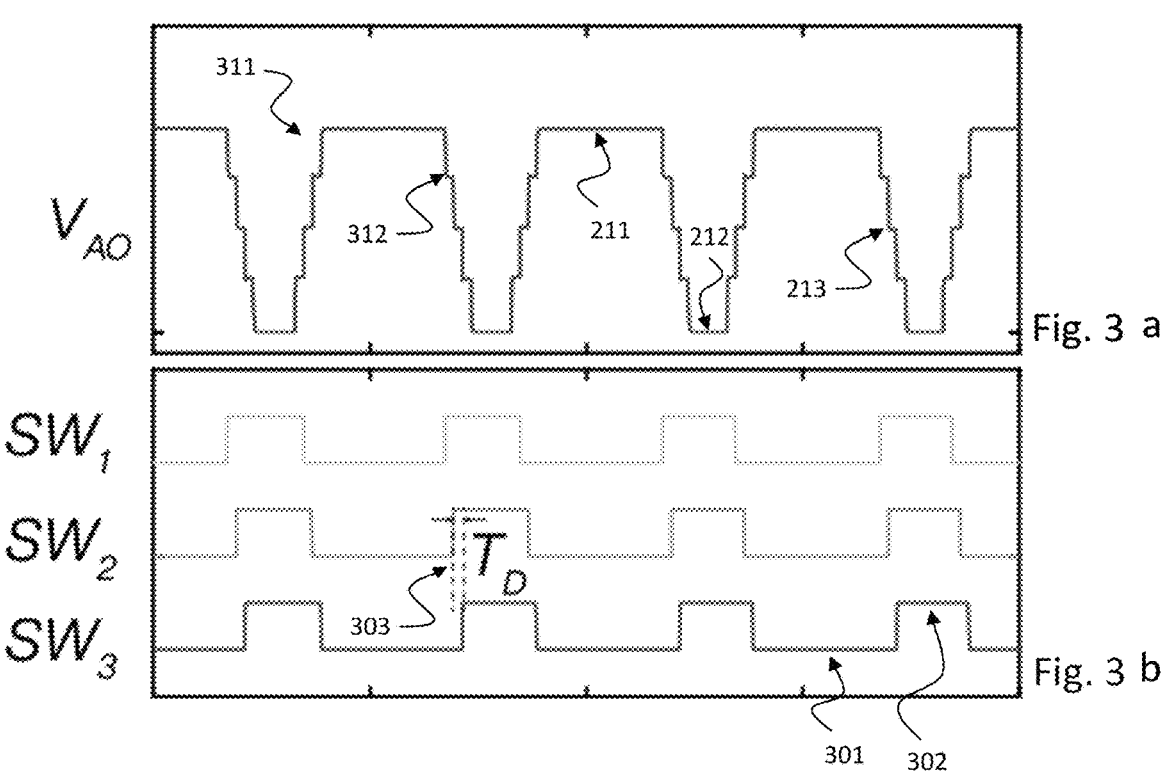
Fig. 3 a
Fig. 3 b

400

600

700

QUASI THREE-LEVEL POWER CONVERTER

CROSS-REFERENCE TO RELATED APPLICATIONS

This application is a continuation of International Application PCT/EP2021/062659, filed on May 12, 2021, the disclosure of which is hereby incorporated by reference in its entirety.

TECHNICAL FIELD

The present disclosure relates to the field of power conversion between AC and DC voltages. In particular the disclosure relates to a quasi-three level power converter, in particular a novel hybrid three level neutral point clamped (3L NPC) converter, termed quasi 3L NPC, as well as a novel method of operating the quasi 3L NPC.

BACKGROUND

Driven by the decreasing cost of the renewable energies, the importance of flexible, controllable and efficient power generation, transmission and consumption is attracting more and more attention. Voltage source medium voltage (MV) AC/DC converters are widely adopted for the energy conversion systems such as smart grid, motor drive, supercharge station and datacenter. Next-generation high-power, high-efficiency and lightweight medium voltage AC/DC converters are the critical technology that will boost the overall performance of the energy conversion systems, driven by the emerging applications. Until so far, the MV converters were designed relying upon Silicon power devices. After many years of development, the performance of the Silicon (Si) devices is gradually reaching its performance limitations. To satisfy the industrial demand, the wide bandgap power (WBG) devices, which have high-temperature endurance, high switching frequency and low switching loss, match very well with the requirements of the MV converters in a wide range of applications. However, simply replacing the state-of-the-art Si IGBTs with wide bandgap devices is not sufficient or enough to benefit from the superior performance of the WBG devices. Several vital challenges related to the cost, extremely fast switching speed and large parasitic parameters in the MV converters must be overcome to gain economic benefits on the system level.

SUMMARY

It is the object of this disclosure to provide a novel power converter based on hybrid three-level neutral point clamped topology and a novel operating method for such a power converter that can greatly reduce the size of the medium voltage converter and that is suitable for WBG power devices integration.

This object is achieved by the features of the independent claims. Further implementation forms are apparent from the dependent claims, the description and the figures.

A basic concept of this disclosure is to present a quasi three-level (3L) power converter and an operation method to operate such a quasi 3L power converter achieving high efficiency and high-power density of the converter. In a quasi 3L NPC phase leg, the devices or groups of devices are divided into two categories. The first one includes the switching devices that are connected to the positive, neutral and negative terminal of the DC capacitor bank, called the vertical leg. The vertical leg devices act as the voltage level selection switches. The other category includes the switching cells that are connected to the intermediate outputs of the vertical leg and to the output of complete leg, which generates the alternative current (AC) output voltage, called horizontal leg. In each switching cell, at least one energy storage devices are required. The horizontal legs act as the current commutation switches. The concerning topics of the converter operation include the output voltage waveform shaping, switching cell energy balancing and the leg control implementation.

In the typical configuration, the vertical switches are made of the directly series-connected power semiconductor devices, and the horizontal leg comprises of the cascaded half-bridge switching cells. In a typical switching cell, the basic circuit contains one fully controllable power device with an anti-parallel diode (main switch), one active clamping switch and the accordingly series-connected switching cell capacitor. Several design and control challenges must be overcome to achieve the high efficiency, low dv/dt and safe operation of the converter.

Firstly, since the vertical leg is composed from the directly series connection of devices, the voltage sharing is of vital importance to avoid overvoltage and thermal stress balancing of the devices. To ensure safety, low-speed switching of the power devices or extra snubbers are commonly added in the series connection technique. The drawback of such configuration is the additional power loss caused by the voltage balancing efforts. Reducing the switching frequency of these devices brings about significant benefits to reduce the switching loss. Thus, a general modulation strategy that ensures the operation of the vertical leg switches at the low frequency, i.e., the fundamental frequency of the output voltage, and the horizontal leg switches at the high frequency is disclosed. For example, for the grid-connected applications, the vertical leg switches at the line frequency, such as 50 Hz or 60 Hz. As a result, the switching loss of the vertical devices is greatly reduced. To generate the switching patterns of every fully controllable device, modification over conventional modulation methods is disclosed.

To begin with, a modified carrier-based pulse width modulation (PWM) is disclosed for the quasi 3L NPC converter. The carrier waveform is triangle and the modulation waveforms are sinusoidal or sinusoidal with the third-order of the fundamental frequency harmonic injection, which is typically used to increase the DC bus voltage utilization ratio. For all the vertical devices, the devices turn-on and turn-off happens at the same time, and the switching only occurs at the cross point of the modulation waveform. When the modulation waveform is above zero, the output voltage of the vertical leg is the positive DC bus voltage and remains unchanged during the positive cycle. Meanwhile, the switching event for the horizontal leg is generated by the comparing results between the carrier waveform and the modulation waveform. This signal is not directly used to control the switching and is called the pre-conditioning switching signal. All the switching signals of devices in the switching cells are orderly generated from the pre-conditioning signal. A small period of the time, called dwell-time, is inserted among the turn-on/off of the main switches in different switching cells. The switching signal of the clamping switch is complementary to the main switch in each switching cell, with a small piece of dead-time inserted. With the modulation method, the phase leg output voltage is similar to the 3L NPC converter, except the trapezoidal voltage transition waveform. This modulation method can be applied in the single-phase system or multi-phase system.

In the example of the three-phase system, a modified space vector modulation strategy can also be applied. The space vector modulation has been widely adopted in the 3L NPC converters. For the quasi 3L NPC converter, these methods are improved to shift the high switching frequency to the horizontal leg and keep the vertical leg in the low switching condition. This can be enabled by selecting the redundant voltage vectors in the three-phase converter. According to the topology of the quasi 3L converter, each phase leg has four different switching states, namely N, P, L, U. The state P means the output voltage equals to the positive bus voltage, N is the result of the negative output voltage, L and U state are the zero output voltage but from different paths, U is generated from the upper horizontal leg and L is from lower horizontal leg. This disclosure presents a redundant switching state selection criterion that shifts the high-frequency switching to the horizontal leg.

The basic idea is that, in one phase leg, when selecting the redundant zero output voltage state, only transition between P↔L and N↔U are allowed. Meanwhile, P↔U and N↔L are forbidden. Since the transition between the P↔U or N↔L requires the high-frequency switching between the vertical leg. Generally, from the external point of view, selecting the zero-voltage state will not influence the output voltage vector of the converter. The main difference occurs in the distribution of the switching frequencies among the vertical leg and the horizontal leg.

To ensure the safe operation of the converter, another critical aspect is the voltage balancing among the switching cell capacitors. Ideally, the capacitor is charged or discharged by the load alternative current equally in every fundamental period. However, due to the possible DC bias in the phase leg output current, the asymmetrical gate driving signals and the small random distribution of the parameters of the components, there will be unequal voltage sharing among the capacitors. Fortunately, the dwell-time can be adjusted to balance the capacitor voltage as the control freedom. To realize this, the voltage of each switching cell is sampled and compared with the ideal value. Then the dwell-time tuning relies on a closed-loop control scheme. PI controller or any other type of controller can be adopted to generate the modified dwell time.

In one example, the direction of the bus voltage deviation in the switching cell and the direction of the load current are adopted as the reference information to control the switching cell bus voltage. Under this simple scheme, the DC bus voltage can be properly controlled and balanced, and only the direction information of the DC bus voltage deviation and the output current is enough.

To simplify the control system of the quasi 3L NPC converter, a control system is disclosed to ensure that the cascaded switching cells behave as the single high voltage devices. Thus, the leg branch handles the PWM signal distribution, protection and the voltage balancing internally. Under the disclosed configuration, control systems, as used in industrial systems can be leveraged in this structure. In the disclosure, a central controller, called the branch controller, is adopted for generating the switching pattern for the switching cells. The switching signal is transmitted to the switching cell through electrically isolated paths such as fiber optical links. In each switching cell, a cell controller is adopted to realize the sampling, protection, and communication.

Inside the central branch controller, there will be several necessary functional blocks to perform the voltage balancing scheme. Firstly, the controller receives the driving signals from the upper-level controller, then portions of dwell-time are inserted and distributed to each port to the switching cells. Besides, there is a voltage balancing unit that handles the voltage balancing of the switching cells and generates, accordingly the dwell-time for each switching cell under the disclosed voltage balancing methods. In this unit, the voltage deviation among the actual capacitor voltage and the ideal cases is calculated and the adjusted dwell-time is generated. Then through the gate driving signal compensation unit, the final driving signal is generated and sent to the switching cell.

During the output voltage transitions of the switching cells, there may be unwanted oscillations in the circuit, which cause Electromagnetic interference (EMI) issues and increase the electrical stress of the components. To prevent potential oscillations, a passive damping scheme is adopted. In the switching cell, a small resistor can be connected in series with the switching cell capacitor to act as the damping circuit to the possible resonant elements. Since the switching cell capacitor is only inserted for a small period of time, the power loss on the resistor is relatively small.

In the present disclosure, the following terms, abbreviations and notations will be used:

MV medium voltage, e.g. between 1 kV and 35 kV, in AC

PWM Pulse Width Modulation

3L NPC three level neutral point clamped converter

CHB Cascaded H Bridge

WBG wide bandgap

MMC modular multilevel converter

Q2L quasi-two-level

THD Total Harmonic Distortion

DC Direct Current

AC Alternating Current

IGBT Insulated Gate Bipolar Transistor

MOSFET Metal-Oxide Semiconductor Field Effect Transistor

EMI Electromagnetic interference

Power converters as described in this disclosure are applied for converting electric energy from one form to another, such as converting between AC and DC. The power converter can also change the voltage or frequency or some combination of these. One way of classifying power conversion systems is according to whether the input and output are AC or DC. Power converters or power electronics converters are based on power electronics switches that can be actively controlled by applying ON/OFF logic (i.e., PWM operation, usually commanded by a power regulation algorithm).

A controller or controlling device as described in this disclosure is any device that can be utilized for regulation of voltage, currents or powers of a power converter, e.g. by switching PWM signals. A controller or controlling device can be a single micro-controller or processor or a multi-core processor or can include a set of micro-controllers or processors or can include means for controlling and/or processing. The controller can perform specific control tasks, for example controlling a converter, according to a software, hardware or firmware application.

In the disclosure, multilevel converters and modular multilevel converters (MMC) are described to demonstrate the advantages of the proposed solution. When it comes down to processing large amounts of power in the range of several Mega Watts, both monolithic and modular converter solutions are possible. Multilevel converters and modular multilevel converter (MMC) are widely adopted for medium voltage AC/DC converters, utilizing a broad range of Si semiconductor devices. Nevertheless, monolithic converters tend to provide higher power density than the modular solution, and are the dominant technology on the market. However, the voltage classes of the commercially available devices are not sufficient to be directly adopted in MV converters, unless the series connection of devices or modular converter structures are adopted. For example, for medium voltages over 10 kVac, either transformer is used in conjunction with standard converter classes (e.g., 3.3 kV, 4.16 kV, 6 kV), CHB (Cascaded H-Bridge)-based topologies or the MMC. These challenges have been addressed by a combination of the MMC and conventional multilevel converters, which replace partial or all devices of the multilevel converter with a string of the half-bridge or full-bridge modules, called hybrid modular multilevel converter. These converters offer improvements such as the reduced number of power devices and capacitors. However, the installed capacitance and total power devices count are still relatively high due to the inherent operating principles of these converters, where the switching cell capacitor is charged or discharged by the second-order fundamental frequency current.

In the disclosure, quasi-two-level (Q2L) converters are described to demonstrate the advantages of the proposed solution. The quasi-two-level (Q2L) converter reduces the volume and power loss of the MV converters. Originally, Q2L converter is viewed as a special operation mode of the MMC converters, in which the switching cell capacitors of the submodules are only inserted for a small period of time, called dwell-time, and the output voltage slew rate is controlled by the duration of the dwell-time and the number of the submodules. Under this operation method, the switching cell capacitor, which is the domain volume components in an MMC submodule, can be greatly reduced. Moreover, Q2L is especially good for wide-bandgap power devices integration by adopting the modular solutions within which the length of the current commutation loop can be greatly reduced and consequently, the switching loss caused by the stray inductance are greatly reduced. However, the drawback of the Q2L converter is that it contains a relatively large voltage harmonics compared to the MMC converters, due to its essentially two-level of the output voltage, despite staircase transitions. As a result, a large filter is required to improve the Total Harmonic Distortion (THD), which is strictly specified in most applications by corresponding standards. The larger filter size usually implies larger power loss in the filter and increased volume of the converter. Even if the WBG devices are adopted to increase the switching speed, which is beneficial for the inductor size reduction, the switching frequency is still limited by the passive components in the circuit.

On the other hand, increasing the number of output voltage levels will significantly reduce the harmonics in the converter voltage (lower the THD) as well as reduce the switching loss of the converter. A switch-capacitor active snubber can be used to partially or entirely replace the devices of the multilevel converter with the WBG power devices based switching cell (the switching cell contains several power devices with at least one energy storage device). However, the disadvantage is that an extra inductor is required in the switching cell, which increases complexity and brings additional loss.

In the disclosure, three level neutral point clamped converters (3L NPC) are described and a novel hybrid 3L NPC as well as a novel method of operating the hybrid 3L NPC, termed quasi 3L NPC is disclosed. The multilevel converter operates with a certain modulation method and control strategy to realize low output harmonic content, low switching loss and voltage balancing of the capacitors (if there are any). In this new type of converter conventional modulation and control method may be adopted. Some of the branch in the three level neutral point clamped converter (3L NPC) may be replaced with a string of cascaded switching cells. However, in this new type of converter, the potentials of the converter are not yet fully explored. In this disclosure, the topology of a novel hybrid 3L NPC is presented and based on this topology, a novel converter operation method, termed quasi 3L NPC, is firstly disclosed.

According to a first aspect, the disclosure relates to a power converter, comprising: a positive, a neutral and a negative terminal, wherein a first DC link capacitor connects the positive terminal with the neutral terminal and a second DC link capacitor connects the neutral terminal with the negative terminal; a first intermediate node, wherein a first vertical switch connects the positive terminal with the first intermediate node and a second vertical switch connects the first intermediate node with the neutral terminal; a second intermediate node, wherein a third vertical switch connects the neutral terminal with the second intermediate node and a fourth vertical switch connects the second intermediate node with the negative terminal; and an AC terminal, wherein a first horizontal switch connects the first intermediate node with the AC terminal and a second horizontal switch connects the second intermediate node with the AC terminal, wherein the vertical and horizontal switches are configured to switch a DC voltage between the positive and negative terminal to an AC voltage at the AC terminal, the AC voltage comprising three main voltage levels, a transition between any two of the main voltage levels following a trapezoidal shape with at least one voltage sub-level.

Such a power converter provides a novel power converter design that is based on hybrid three-level neutral point clamped topology and a novel operating method that can greatly reduce the size of the medium voltage converter and that is suitable for WBG power devices integration.

The power converter provides the following advantages: The output voltage features lower dv/dt and more voltage levels, therefore, the filter size can be reduced as well as associated power losses. The loop inductance can be reduced due to more compact design, which enables easy integration of high speed switching devices such as SiC (Silicon Carbide) MOSFET (Metal Oxide Field-Effect Transistor). Voltage balance can be implemented with relatively slow control loop. The converter features modular design and can be easily scaled for different power/voltage. With a centralized controller everything can be handled within modules. Each cascaded half-bridge arm acts as a single high voltage device, which simplifies design and practical implementation.

In an exemplary implementation of the power converter, the vertical switches are configured to switch based on a modulation waveform at a fundamental frequency, in particular 50/3 Hz, 50 Hz or 60 Hz; and the horizontal switches are configured to switch based on a carrier waveform at a carrier frequency, in particular a triangular carrier waveform.

The fundamental frequency of modulation waveform of the power line defines the low frequency while the carrier frequency of carrier waveform defines the high frequency that is higher than the fundamental frequency or low frequency, respectively. Other frequencies for the fundamental frequency than defined here are possible as well, for example 60/3 Hz or 50/2 Hz, 60/2 Hz, 50/4 Hz, 60/4 Hz, etc.

Such a power converter provides a quasi three-level (3L) converter achieving high efficiency and high-power density.

In an exemplary implementation of the power converter, a switching signal for the horizontal switches is based on a comparison between the carrier waveform and the modulation waveform.

This provides the advantage that the vertical leg switches at the fundamental frequency while the horizontal leg switches at the high frequency.

In an exemplary implementation of the power converter, the vertical and horizontal switches are configured to switch based on space vector modulation, one phase leg comprising the following switching states: a first switching state P in which the AC voltage at the AC terminal equals to a positive voltage at the positive terminal; a second switching state N in which the AC voltage at the AC terminal equals to a negative voltage at the negative terminal; a third switching state L in which the AC voltage at the AC terminal equals to a zero voltage switched from the neutral terminal via the second horizontal switch to the AC terminal; and a fourth switching state U in which the AC voltage at the AC terminal equals to a zero voltage switched from the neutral terminal via the first horizontal switch to the AC terminal.

This provides the advantage of improving the switching by shifting the high switching frequency to the horizontal leg and keeping the vertical leg in the low switching frequency state.

In an exemplary implementation of the power converter, the horizontal switches are configured to enable: during a positive cycle of the modulation waveform only a transition between the first switching state P and the third switching state L; during a zero crossing point of the modulation waveform only a transition between the third switching state L and the fourth switching state U; and during a negative cycle of the modulation waveform only a transition between the second switching state N and the fourth switching state U;

This provides the advantage of ensuring the low switching frequency of the vertical leg. Selecting the zero-voltage state will not influence the output voltage vector of the converter. The advantage over a conventional scheme lies in the distribution of the switching frequencies among the vertical leg and the horizontal leg.

In an exemplary implementation of the power converter, each of the horizontal switches comprises at least two switching cells, each of the at least two switching cells being configured to output a zero and at least a positive voltage. Other voltage levels are also possible, e.g., negative voltage.

This provides the advantage that the output voltage features lower dv/dt and more voltage levels, therefore, the filter size can be reduced as well as associated power losses.

In an exemplary implementation of the power converter, the at least two switching cells of the first horizontal switch are arranged in series between the first intermediate node and the AC terminal; and the at least two switching cells of the second horizontal switch are arranged in series between the second intermediate node and the AC terminal.

This provides the advantage that the power converter can have a modular design and can be easily scaled for different powers or voltages.

In an exemplary implementation of the power converter, two successive switching cells of the series of at least two switching cells are configured to switch with a mutual time delay corresponding to a dwell time.

This provides the advantage that this modulation will shape the output voltage to be three-level and the transition between different voltage levels is decided by the dwell-time. As a result, the dv/dt of the leg voltage can be reduced, which is beneficial for the insulation stress reduction and power loss reduction in passive components, such as the leg output inductor.

In an exemplary implementation of the power converter, the switching cells are configured to shape the transition between any two of the main voltage levels of the power converter based on the dwell time.

This provides the advantage that the current commutation occurs inside the switching cells, thus the loop inductance can be greatly reduced and it is suitable for the wide bandgap power devices integration. Meanwhile, the devices of the vertical leg can be high voltage Si devices to reduce cost.

In an exemplary implementation of the power converter, the dwell time is the same or is different for two switching cells of the series of at least two switching cells.

This provides the advantage that the dwell time can be optimally adjusted for an optimal switching of the power converter.

In an exemplary implementation of the power converter, the power converter comprises: a branch controller configured to provide the switching signal and adjust the dwell time for each switching cell.

This provides the advantage that the branch controller can make the switching cell branch to operate as a single high voltage device from the external point of view.

In an exemplary implementation of the power converter, the branch controller is configured to adjust the dwell time for each switching cell based on a balance of voltages among capacitors in the switching cell.

This provides the advantage that the dwell-time can be adopted as the active voltage balancing control freedom.

In an exemplary implementation of the power converter, each of the at least two switching cells comprises at least one main switch, at least one auxiliary switch and a switching cell capacitor.

In one possible configuration, the switching cell capacitor is bypassed by the main switch, when the main switch is turned-on; and the switching cell capacitor is inserted into the respective switching cell, when the main switch is turned-off and the auxiliary switch is turned-on.

This provides the advantage that the output voltage slew rate can be reduced.

In an exemplary implementation of the power converter, each of the at least two switching cells further comprises a resistor arranged in series with the switching cell capacitor.

In an exemplary implementation of the power converter, each of the at least two switching cells further comprises a resistor arranged in parallel with the switching cell capacitor.

Such a resistor, either arranged in series or in parallel with the switching cell capacitor, provides the advantage of implementing a passive damping for preventing possible oscillation of the converter.

In an exemplary implementation of the power converter, the power converter comprises: a central controller, configured to provide switching signals, in particular pulse width modulation, for switching the vertical switches and the horizontal switches.

With such a centralized controller handling, each cascaded half-bridge arm acts as a single high voltage device, which simplifies design and practical implementation.

According to a second aspect, the disclosure relates to a method for controlling a power converter, the power converter, comprising: a positive, a neutral and a negative terminal, wherein a first DC link capacitor connects the positive terminal with the neutral terminal and a second DC link capacitor connects the neutral terminal with the negative terminal; a first intermediate node, wherein a first vertical switch connects the positive terminal with the first intermediate node and a second vertical switch connects the first intermediate node with the neutral terminal; a second intermediate node, wherein a third vertical switch connects the neutral terminal with the second intermediate node and a fourth vertical switch connects the second intermediate node with the negative terminal; and an AC terminal, wherein a first horizontal switch connects the first intermediate node with the AC terminal and a second horizontal switch connects the second intermediate node with the AC terminal, wherein the method comprises: switching, by the vertical and horizontal switches, a DC voltage between the positive and negative terminal to an AC voltage at the AC terminal, the AC voltage comprising three main voltage levels, a transition between any two of the main voltage levels following a trapezoidal shape with at least one voltage sub-level.

Such a method provides a novel operating method that can greatly reduce the size of the medium voltage converter and that is suitable for WBG power devices integration.

BRIEF DESCRIPTION OF THE DRAWINGS

Further embodiments of the present disclosure will be described with respect to the following figures, in which:

FIG. 2 a-c shows a timing diagram 200 illustrating an exemplary timing of the Carrier PWM based modulation for the quasi three-level converter according to the disclosure;

FIG. 3 a-b shows a timing diagram 300 illustrating exemplary driving signals of the main switches in the switching cell of the quasi three-level converter according to the disclosure;

DETAILED DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless noted otherwise.

The concept described in this disclosure is widely applicable to various AC/DC power conversion scenarios. For a better understanding the following sections give a detailed description on the solutions of the disclosed novel structures.

Figure 1:
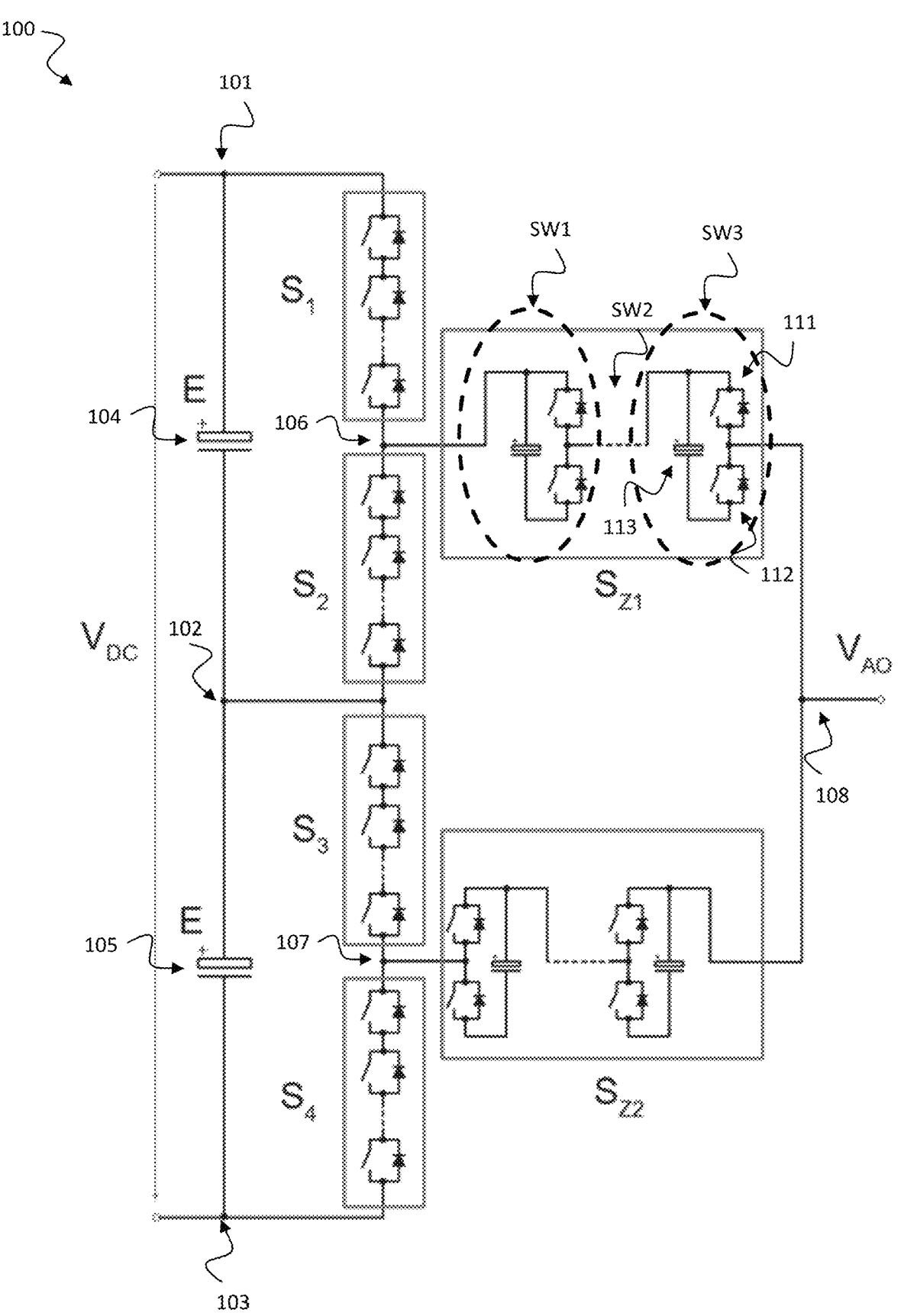
FIG. 1 shows a circuit diagram illustrating the topology of the quasi 3L NPC converter 100 according to the disclosure.

FIG. 1 shows a circuit diagram illustrating the topology of the quasi 3L NPC converter 100 according to the disclosure. $S_1$-$S_4$ are the vertical switches; $S_{Z1}$ and $S_{Z2}$ are the horizontal branch.

FIG. 1 demonstrates the topology of one phase leg of the quasi 3L NPC converter 100, where switch $S_1$, $S_2$, $S_3$, $S_4$ are vertical switches that are directly connected to the three DC ports 101, 102, 103 of the DC capacitor bank 104, 105. $S_{Z1}$ and $S_{Z2}$ comprise of a branch of the cascaded switching cells, denoted as SW1, SW2, SW3. In each switching cell SW1, SW2, SW3, at least one active device, denoted as 111, 112 and one switching cell capacitor 113 are added. In some examples, a resistor is added to prevent the parasitic oscillation during the transition of the converters. The DC bus voltage is $V_{DC}$, and the voltage of each bus capacitor is E, the output voltage of the phase leg is $V_{AO}$. The devices $S_1$-$S_4$ must be able to block half of the DC bus voltage. In medium or high voltage applications, directly series connection of the power devices or single high voltage devices is necessary. The drawback is that $S_1$-$S_4$ will have large power loss brought by the series-connected devices, which is approximately proportional to the switching frequency.

To improve power conversion efficiency, reducing the switching frequency of $S_1$-$S_4$ devices brings significant benefits. Thus, the general modulation strategy is to ensure the vertical leg switches at the low frequency, i.e., the fundamental frequency of the output voltage, and the horizontal leg switches at the high frequency. For example, for the grid-connected applications, the vertical leg switches at the line frequency, such as 50 Hz or 60 Hz. As a result, the switching loss of the vertical devices is greatly reduced. To generate the switching pattern of every fully controllable device, two modifications over classical modulation strategies are disclosed to come to a power converter 100 as described in the following.

This power converter 100 comprises: a positive 101, a neutral 102 and a negative 103 terminal, wherein a first DC link capacitor 104 connects the positive terminal 101 with the neutral terminal 102 and a second DC link capacitor 105 connects the neutral terminal 102 with the negative terminal 103.

The power converter 100 comprises a first intermediate node 106, wherein a first vertical switch $S_1$ connects the positive terminal 101 with the first intermediate node 106 and a second vertical switch $S_2$ connects the first intermediate node 106 with the neutral terminal 102. The power converter 100 comprises a second intermediate node 107, wherein a third vertical switch $S_3$ connects the neutral terminal 102 with the second intermediate node 107 and a fourth vertical switch $S_4$ connects the second intermediate node 107 with the negative terminal 103.

The power converter 100 comprises an AC terminal 108, wherein a first horizontal switch $S_{Z1}$ connects the first intermediate node 106 with the AC terminal 108 and a second horizontal switch $S_{Z2}$ connects the second intermediate node 107 with the AC terminal 108.

The vertical $S_1$, $S_2$, $S_3$, $S_4$ and horizontal $S_{Z1}$, $S_{Z2}$ switches are configured to switch a DC voltage $V_{DC}$ between the positive 101 and negative 103 terminal to an AC voltage $V_{AO}$ at the AC terminal 108, the AC voltage comprising three main voltage levels 211, 212, 213, e.g. as shown in FIG. 2, a transition between any two of the main voltage levels 211, 212, 213 following a trapezoidal shape 311, e.g. as shown in FIG. 3, with at least one voltage sub-level 312.

The timing diagrams of these signals are described in the following.

FIG. 2 shows a time diagram 200 illustrating an exemplary timing of the Carrier PWM based modulation for the quasi three-level converter according to the disclosure. The vertical leg switches at the fundamental frequency. The horizontal leg switches at the high frequency.

FIG. 2 demonstrates the carrier-based modulation waveform. The carrier waveform 202 is triangle and the modulation waveforms 201 are the desired fundamental output waveforms. Besides, the modulation waveform 201 can be any shape according to the application requirements. In this case, the sinusoidal waveform with a common voltage injection is adopted as an example. During the positive cycle, $S_1$ and $S_3$ remain in the on state, and $S_2$ and $S_4$ remain in the off state. The branch $S_{z1}$ and $S_{z2}$ act as the output positive voltage or zero voltage commuting switches. The switching signal is generated from the comparison between the carrier waveform 202 and the modulation waveform 201. When the $S_{z1}$ and $S_{z2}$ signals are generated, the switching signals of the submodule need to be generated.

In the power converter 100 shown in FIG. 1, the vertical switches $S_1$, $S_2$, $S_3$, $S_4$ may be configured to switch based on a modulation waveform 201 at a fundamental frequency, e.g. 50/3 Hz, 50 Hz or 60 Hz. The horizontal switches $S_{Z1}$, $S_{Z2}$ may be configured to switch based on a carrier waveform 202 at a carrier frequency, e.g. a triangular carrier waveform as exemplarily shown in FIG. 2a.

The fundamental frequency of modulation waveform of the power line defines the low frequency while the carrier frequency of carrier waveform defines the high frequency that is higher than the fundamental frequency or low frequency, respectively.

Other frequencies for the fundamental frequency than defined here are possible as well, for example 60/3 Hz or 50/2 Hz, 60/2 Hz, 50/4 Hz, 60/4 Hz, etc.

A switching signal 203 for the horizontal switches $S_{Z1}$, $S_{Z2}$ may be based on a comparison between the carrier waveform 202 and the modulation waveform 201 as exemplarily shown in FIG. 2b.

The vertical $S_1$, $S_2$, $S_3$, $S_4$ and horizontal $S_{Z1}$, $S_{Z2}$ switches are configured to switch the DC voltage $V_{DC}$ between the positive 101 and negative 103 terminal to an AC voltage $V_{AO}$ at the AC terminal 108 as shown in FIG. 1. The AC voltage comprises three main voltage levels 211, 212, 213 as shown in FIG. 2c. A transition between any two of the main voltage levels 211, 212, 213 follows a trapezoidal shape as can be seen in FIG. 2c and also in more detail in FIG. 3.

FIG. 3 shows a time diagram 300 illustrating exemplary driving signals of the main switches in the switching cell of the quasi three-level converter according to the disclosure.

FIG. 3a shows a section of FIG. 2c in more detail. The transition between a first main voltage level 211 to a second main voltage level 212. As described above, the transition between any two of the main voltage levels 211, 212, 213 follows a trapezoidal shape 311 with at least one voltage sub-level 312. In FIG. 3a, an exemplary number of three voltage sub-level 312 are shown. It understands that any other number of voltage sub-levels 312 is possible as well, for example 1, 2, 4, 5, 6, 7, 8, etc.

FIG. 3b shows the switching pattern generating method. In each switching cell SW1, SW2, SW3 (see FIG. 1), there will be one main switch 111 and one auxiliary switch 112. When the main switch 111 is turned-on, the switching cell capacitor is bypassed by the main switch 111. When the main switch 111 is turned-off and the auxiliary switch 112 is turned-on, the cell capacitor is inserted into the branch to offer a temporary support for the branch output voltage and consequently, reduce the output voltage slew rate. Taking the branch $S_{z1}$ for example (see FIG. 1), the duty cycle of the main switches 111 in the switching cells is the same as $S_{Z1}$, and there will be a time delay among different switching cells. The time delay $T_d$ is called dwell-time 303. As pictured, this modulation will shape the output voltage $V_{AO}$ to be three-level and the transition between different voltage levels is decided by the dwell-time. As a result, the dv/dt of the leg voltage can be reduced, which is beneficial for the insulation stress reduction and power loss reduction in passive components, such as the leg output inductor. The current commutation occurs inside the switching cells, thus the loop inductance can be greatly reduced and it is suitable for the wide bandgap power devices integration. Meanwhile, the devices of the vertical leg can be high voltage Si devices to reduce cost. An example of the one-phase operation waveform is given in FIG. 4.

In the power converter 100 shown in FIG. 1, each of the horizontal switches $S_{z1}$, Sze may comprise at least two switching cells $SW_1$, $SW_2$, $SW_3$, as shown in FIG. 1, for example, each of the at least two switching cells being configured to output a zero 301 and at least a positive voltage 302 as shown in FIG. 3b.

Other voltage levels are also possible, e.g., negative voltage.

The at least two switching cells $SW_1$, $SW_2$, $SW_3$ of the first horizontal switch $S_{Z1}$ may be arranged in series between the first intermediate node 106 and the AC terminal 108 as shown in FIG. 1. The at least two switching cells $SW_1$, $SW_2$, $SW_3$ of the second horizontal switch Sze may be arranged in series between the second intermediate node 107 and the AC terminal 108.

Two successive switching cells of the series of at least two switching cells $SW_1$, $SW_2$, $SW_3$ may be configured to switch with a mutual time delay 303 corresponding to the dwell time $T_D$ as exemplarily shown in FIG. 3b.

The switching cells $SW_1$, $SW_2$, $SW_3$ may be configured to shape the transition between any two of the main voltage levels 211, 212, 213 as shown in FIG. 2 of the power converter 100 based on the dwell time $T_D$.

The dwell time $T_D$ can be the same or can be different for two switching cells of the series of at least two switching cells $SW_1$, $SW_2$, $SW_3$.

Figure 4:
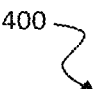
FIG. 4 shows a timing diagram 400 illustrating exemplary operation waveforms including phase leg output voltage (FIG. 4a), output inductor current (FIG. 4b) and submodule capacitor voltage (FIG. 4c) of the quasi three-level converter according to the disclosure.
Figure 4:
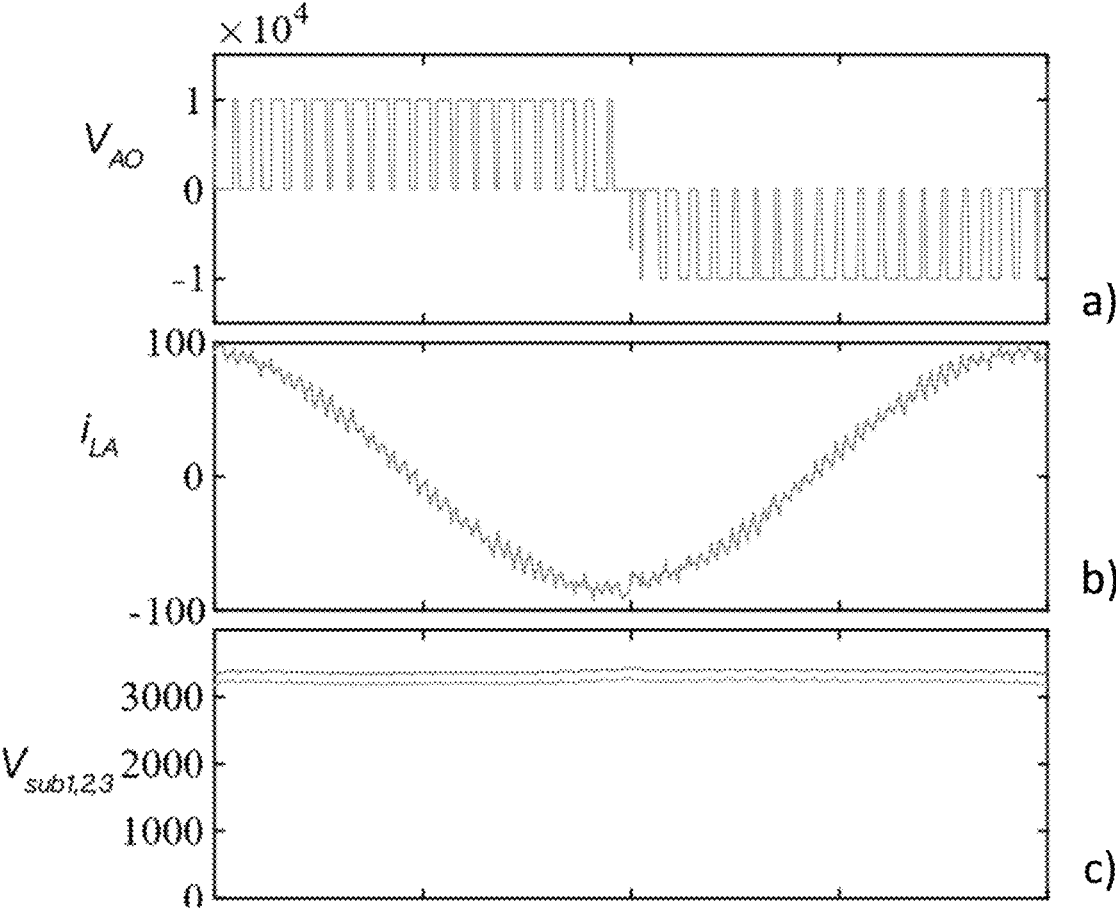

FIG. 4 shows a time diagram 400 illustrating exemplary operation waveforms including phase leg output voltage (FIG. 4a), output inductor current (FIG. 4b) and submodule capacitor voltage (FIG. 4c) of the quasi three-level converter according to the disclosure.

Another modulation strategy for AC/DC power conversion systems is the space vector modulation method. Basically, the output voltage vectors of the three-phase leg are the same as the conventional 3L NPC converter. However, for the quasi 3L NPC converter 100 as exemplarily shown in FIG. 1, the conventional methods are improved in this disclosure to shift the high switching frequency to the horizontal leg and keep the vertical leg in the low switching frequency state. Fortunately, since there are two paths of the zero-voltage output of the phase leg, there are more switching states compared with conventional 3L NPC converter. According to the topology of the quasi 3L NPC converter, each phase leg has four different switching states, namely N, P, L, U. as exemplarily shown in FIG. 5.

FIGS. 5a to 5d show the circuit diagrams 500 of the quasi three level converter 100 illustrating the paths of the output states in one phase leg for the quasi three-level converter 100 shown in FIG. 1.

Figure 5:
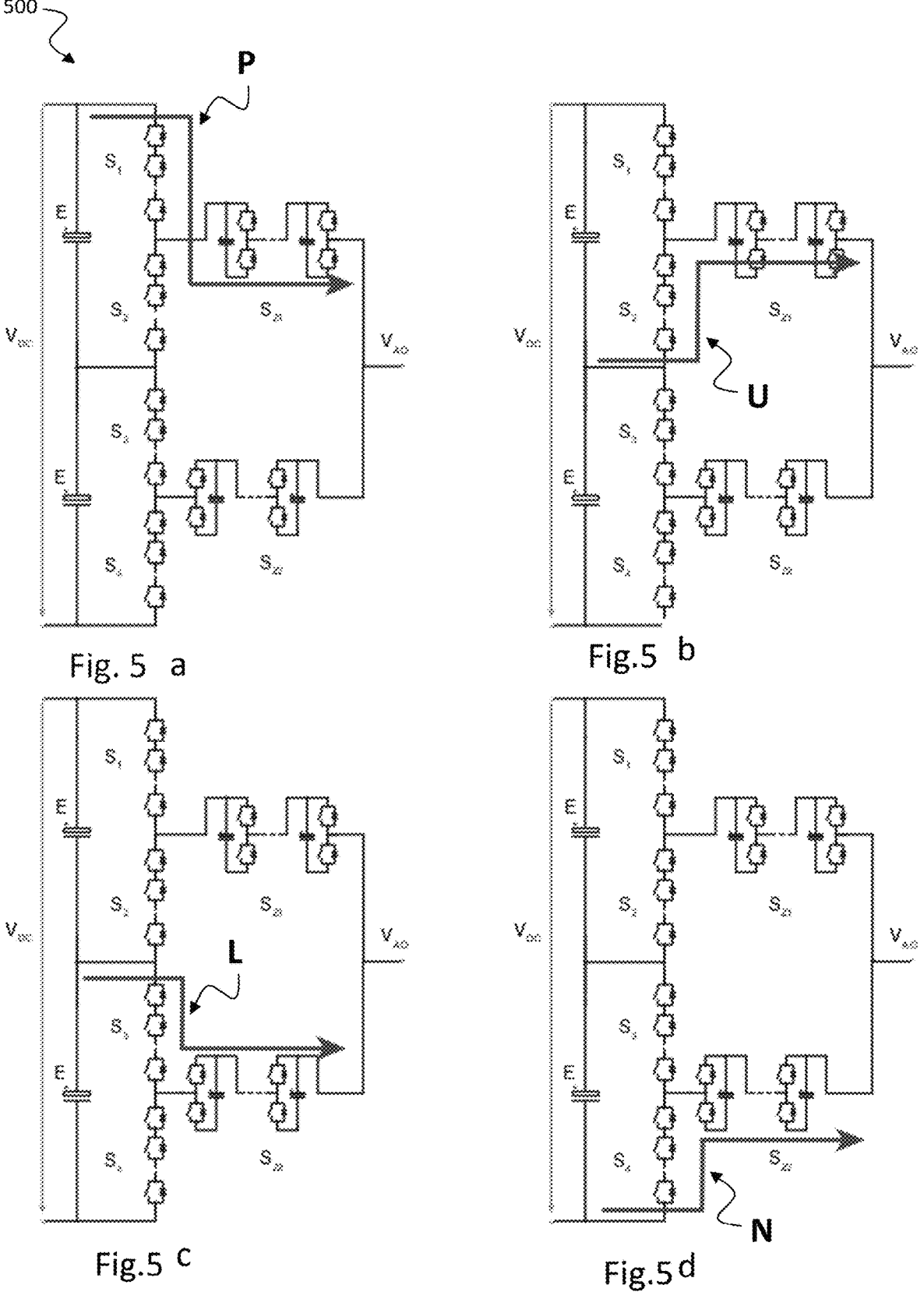
FIGS. 5a to 5d show a circuit diagrams 500 illustrating the paths of the output states in one phase leg for the quasi three-level converter according to the disclosure.

FIG. 5 demonstrates the paths of the output states in one phase leg: P means the output voltage equals to the positive bus voltage; N is the result of the negative output voltage; L and U state are the zero output voltage but from different paths. In total, there are 64 different output states for a three-phase system. These switching states can be classified into 18 different space vectors, the same as the conventional ANPC converter. In the practical application, the selection of the space vector region, calculation of the duration of the vector time and the bus voltage balancing methods are the same as the conventional methods. This disclosure presents a redundant switching state selection criterion that shifts the high-frequency switching to the horizontal leg. Table 1 below gives the space vector selection criterion according to an example. In the positive cycle, when selecting the redundant vectors, only the transition between the P and L are allowed, and the transition between the state U and L are deleted. In the negative half cycle, the transition between N and U is allowed and the transitions between the state N and L are deleted. As a result, the low switching frequency of the vertical leg is ensured. Within the disclosed method, from the external point of view, selecting the zero-voltage state will not influence the output voltage vector of the converter. The main difference occurs at the distribution of the switching frequencies among the vertical leg and the horizontal leg.

TABLE 1

| Space vector selection criterion according to an example | | | | | | |
|---|---|---|---|---|---|---|
| | $S_1$ | $S_2$ | $Sz_1$ | $Sz_2$ | $S_3$ | $S_4$ | |
| P↔L | | ✓ | ✓ | | | | Positive half cycle |
| L↔U | ✓ | ✓ | ✓ | ✓ | ✓ | ✓ | Zero crossing point |
| N↔U | | ✓ | ✓ | | | | Negative half cycle |

In the power converter 100 as exemplarily shown in FIG. 1, the vertical and horizontal switches $S_1$, $S_2$, $S_3$, $S_4$, $S_{Z1}$, $S_{Z2}$ may be configured to switch based on space vector modulation, one phase leg comprising the following switching states:
  1) a first switching state P in which the AC voltage $V_{AO}$ at the AC terminal 108 equals to a positive voltage at the positive terminal 101;
  2) a second switching state N in which the AC voltage $V_{AO}$ at the AC terminal 108 equals to a negative voltage at the negative terminal;
  3) a third switching state L in which the AC voltage $V_{AO}$ at the AC terminal 108 equals to a zero voltage switched from the neutral terminal 102 via the second horizontal switch Sze to the AC terminal 108; and
  4) a fourth switching state U in which the AC voltage $V_{AO}$ at the AC terminal 108 equals to a zero voltage switched from the neutral terminal 102 via the first horizontal switch $S_{z1}$ to the AC terminal 108.
The horizontal switches $S_{Z1}$, $S_{Z2}$ may be configured to enable:

1) during a positive cycle 204 (see FIG. 2) of the modulation waveform 201 only a transition between the first switching state P and the third switching state L;
  2) during a zero crossing point 206 of the modulation waveform 201 only a transition between the third switching state L and the fourth switching state U; and
  3) during a negative cycle 205 of the modulation waveform 201 only a transition between the second switching state N and the fourth switching state U.

Figure 6:
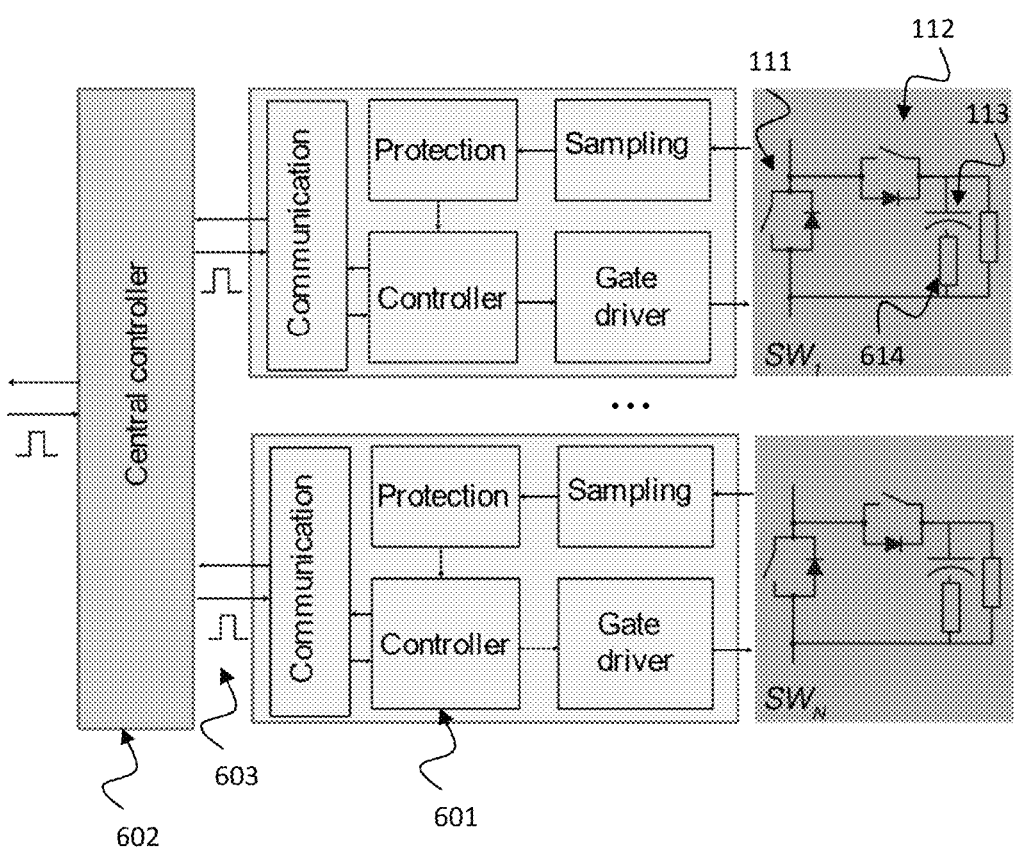
FIG. 6 shows a schematic diagram illustrating an exemplary branch controller structure 600 for the quasi three-level converter according to the disclosure.

FIG. 6 shows a schematic diagram illustrating an exemplary branch controller structure 600 for the quasi three-level converter according to the disclosure.

The branch controller structure 600 is an example for controlling the switching cells $SW_1$, $SW_2$, $SW_3$ of the quasi three-level converter 100 shown in FIG. 1.

In the power converter 100 a branch controller 601 may be configured to provide the switching signal 603 and adjust the dwell time $T_D$ as described above with respect to FIG. 3 for each switching cell $SW_1$, $SW_2$, $SW_3$.

The branch controller 601 may be configured to adjust the dwell time $T_D$ for each switching cell $SW_1$, $SW_2$, $SW_3$ based on a balance of voltages among capacitors in the switching cell $SW_1$, $SW_2$, $SW_3$.

Each of the at least two switching cells $SW_1$, $SW_2$, $SW_3$ may comprise at least one main switch 111, at least one auxiliary switch 112 and a switching cell capacitor 113 as shown in FIG. 6.

In one possible configuration, the switching cell capacitor 113 is bypassed by the main switch 111, when the main switch 111 is turned-on; and the switching cell capacitor 113 is inserted into the respective switching cell $SW_1$, $SW_2$, SW), when the main switch 111 is turned-off and the auxiliary switch 112 is turned-on.

Each of the at least two switching cells $SW_1$, $SW_2$, $SW_3$ may further comprise a resistor 614 arranged in series with the switching cell capacitor 113 or arranged in parallel with the switching cell capacitor 113.

A central controller 602 may be configured to provide switching signals 603, in particular pulse width modulation, for switching the vertical switches $S_1$, $S_2$, $S_3$, $S_4$ and the horizontal switches $S_{Z1}$, $S_{Z2}$ (see FIG. 1).

The target of this control system 600 is to make the switching cell branch operate as a single high voltage device from the external point of view. A central controller 602 is placed to communicate, distribute PWMs 603 and balance the voltage of the switching cells $SW_1$, . . . , $SW_N$. This central controller 602 can be realized by FPGA or any other digital controller. The switching cell contains its own controller 601 that carries out the protection, gate driving and sampling functionalities. The cell controller 601 and branch controller 602 (also denoted as branch controller) are connected together with the electrically isolated communications such as the fiber optics. With this configuration, the central controller 602 receives the information from the switching cells $SW_1$, . . . , $SW_N$ and distributes information to the switching cells, enabling the normal function of the branch. The driving signals $S_{z1}$ and $S_{z2}$ are enough to ensure the normal operation of the branch. This configuration makes it possible to leverage existing controllers of the converter system, thus reducing the cost and the complexity of the product development phase.

Figure 7:
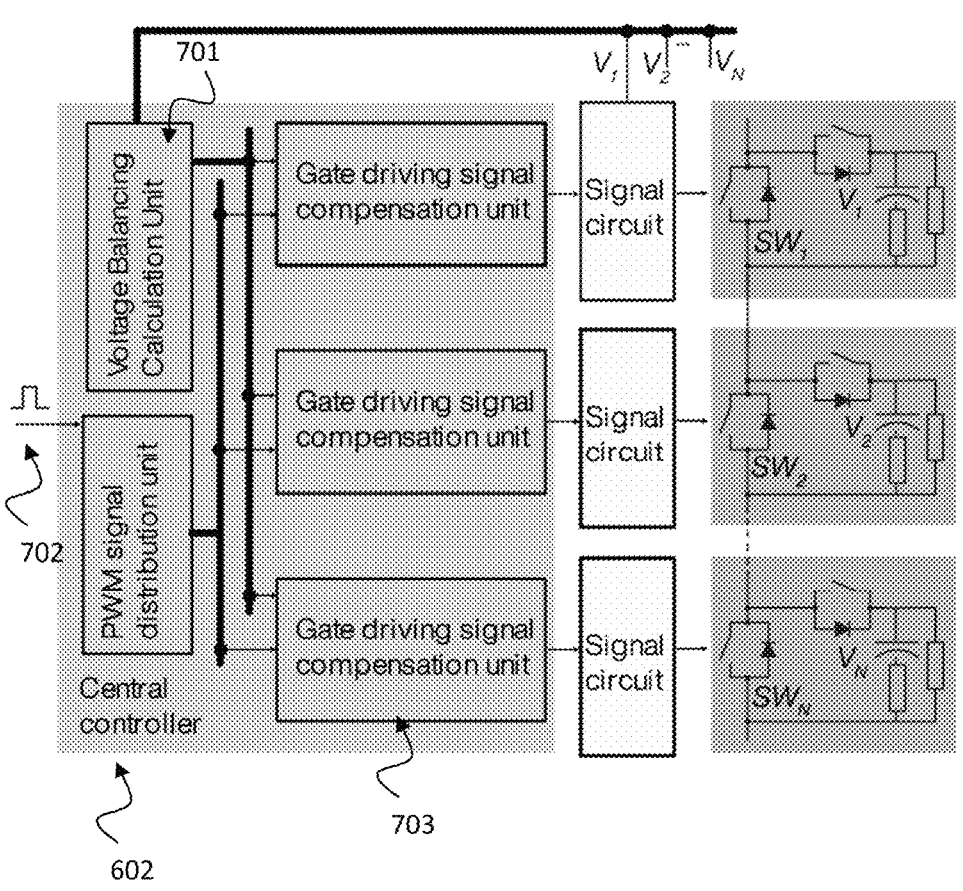
FIG. 7 shows a schematic diagram illustrating an exemplary Switching cell capacitor voltage balancing scheme 700 for the quasi three-level converter according to the disclosure.

Following this structure, inside the branch controller, there are several necessary functional units to conduct the voltage balancing scheme, as demonstrated in FIG. 7.

FIG. 7 shows a schematic diagram illustrating an exemplary Switching cell capacitor voltage balancing scheme 700 for the quasi three-level converter according to the disclosure.

Firstly, the controller 602 receives the driving signals 702 from the upper-level controller, then pieces of dwell-time are inserted to distribute to each port to the switching cells $SW_1$, $SW_2$, . . . , $SW_N$. Besides, there is a voltage balancing unit 701 that handles the voltage balancing of the switching cells $SW_1$, $SW_2$, . . . , $SW_N$ and generates the accordingly dwell-time for each switching cell under the disclosed voltage balancing methods. In this unit 701, the voltage deviation among the actual capacitor voltage and the ideal cases is calculated and the adjusted dwell-time 303, as shown in FIG. 3, is generated. Finally, through the gate driving signal compensation unit 703, the final driving signal will be generated and sent to the switching cell $SW_1$, $SW_2$, . . . , $SW_N$.

To ensure the safe operation of the converter, another important aspect is the voltage balancing among the capacitors of the switching cells $SW_1$, $SW_2$, . . . , $SW_N$. Ideally, the capacitor of the switching cell is charged or discharged by the load alternative current equally in every fundamental period. However, due to the possible DC bias in the phase leg output current, asymmetrical gate driving signals, and small random distribution of the parameters of the power devices, there will be unequal voltage sharing among the switching cell capacitors. Fortunately, the dwell-time 303 (see FIG. 3) can be adjusted to balance the capacitor voltage. In the disclosure, the dwell-time 303 is adopted as the active voltage balancing control freedom. To achieve this, the voltage of each switching cell $SW_1$, $SW_2$, . . . , $SW_N$ is sampled and compared with the ideal value when the DC bus voltage is equally shared among all the capacitors. When the switching cell capacitor is inserted, it will be charged or discharged by the load current. The duration of the charging time will be influenced by the dwell-time. Thus, if one capacitor voltage is smaller than the ideal value, the dwell-time 303 during the charging phase of the switching cell $SW_1$, $SW_2$, . . . , $SW_N$ will be increased. If one capacitor voltage is larger than the ideal value, the dwell-time 303 during the discharging phase will be increased. Under this scheme the switching cell voltages will be balanced under ideal conditions. The adjusting of the dwell-time 303 may rely on a closed-loop control scheme. The conventional PI controller or any other type of controller can be adopted to tune the dwell-time 303.

In one example of the voltage balancing, the direction of the bus voltage deviation in the switching cell $SW_1$, $SW_2$, . . . , $SW_N$ and the direction of the load current are adopted as the reference information to control the dwell-time. Firstly, the voltages of the N switching cells $(V_1, V_2, . . . , V_N)$ are measured by the sampling circuit in the switching cell. Then the average voltage is selected as the reference voltage as the ideal balanced conditions. The voltage deviation is defined by $\Delta_{vi}=E/N-V_i$, where E is the half of the DC bus voltage. The charging or discharging current of the capacitor is L. If the capacitor is charged when the cell capacitor is inserted, L is positive. If $\Delta V_i I_i > 0$, which means the capacitor voltage is larger than the reference value, and the capacitor is still being charged. Therefore, it is necessary to reduce the charging time of the capacitor. It is beneficial to reduce the dwell-time to reduce the charge flow to the capacitor. Under this case, the dwell-time is set to the minimum value $T_{d\_min}$. If $\Delta V_i I_i < 0$, which means the capacitor voltage is smaller than the desired value, and capacitor is charged, the dwell-time is set to the maximum value $T_{d\_max}$ to increase the charge flow to the capacitor. Under this scheme, the capacitor voltage can remain at a dynamically balanced state.

Further, it is not necessary to measure the current direction of every switching cell. Since the direction of the capacitor current equals to the phase leg output current (ignoring the current ripple), the direction of the output current equals to the load current $I_L$. Thus, the above-mentioned L can be replaced by the $I_L$, taking $S_{z1}$ branch for example.

During the high-frequency switching of the switching cells $SW_1$, $SW_2$, . . . , $SW_N$, there will be unwanted oscillations in the circuit, which cause EMI issues to the circuit and increase the electrical stress of the converter. To prevent the possible oscillation, a passive damping scheme is disclosed. A small resistor can be connected in series with the bus capacitor to prevent the potential oscillations during switching. Since the switching cell capacitor is only inserted for a small period of time, the power loss on the resistor is relatively small.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the present disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the present disclosure may be practiced otherwise than as described herein.

17

What is claimed is:

1. A power converter, comprising:
a positive terminal;
a neutral terminal;
a negative terminal, wherein a first DC link capacitor connects the positive terminal with the neutral terminal and a second DC link capacitor connects the neutral terminal with the negative terminal;
a first intermediate node, wherein a first vertical switch connects the positive terminal with the first intermediate node and a second vertical switch connects the first intermediate node with the neutral terminal;
a second intermediate node, wherein a third vertical switch connects the neutral terminal with the second intermediate node and a fourth vertical switch connects the second intermediate node with the negative terminal; and
an AC terminal, wherein a first horizontal switch connects the first intermediate node with the AC terminal and a second horizontal switch connects the second intermediate node with the AC terminal,
wherein the vertical and horizontal switches are configured to switch a DC voltage between the positive and negative terminal to an AC voltage at the AC terminal, the AC voltage comprising three main voltage levels, a transition between any two of the main voltage levels following a trapezoidal shape with at least one voltage sub-level, wherein each of the vertical switches are made of directly series-connected power semiconductor devices.

2. The power converter of claim 1,
wherein the vertical switches are configured to switch based on a modulation waveform at a fundamental frequency, wherein the fundamental frequency is 50/3 Hz, 50 Hz or 60 Hz; and
wherein the horizontal switches are configured to switch based on a carrier waveform at a carrier frequency, wherein the carrier waveform is a triangular carrier waveform.

3. The power converter of claim 2,
wherein a switching signal for the horizontal switches is based on a comparison between the carrier waveform and the modulation waveform.

4. The power converter of claim 2,
wherein the vertical and horizontal switches are configured to switch based on a space vector modulation, and wherein one phase leg comprises:
a first switching state (P) in which the AC voltage at the AC terminal equals to a positive voltage at the positive terminal;
a second switching state (N) in which the AC voltage at the AC terminal equals to a negative voltage at the negative terminal;
a third switching state (L) in which the AC voltage at the AC terminal equals to a zero voltage switched from the neutral terminal via the second horizontal switch to the AC terminal; and
a fourth switching state (U) in which the AC voltage at the AC terminal equals to a zero voltage switched from the neutral terminal via the first horizontal switch to the AC terminal.

5. The power converter of claim 4, wherein the horizontal switches are configured to enable:
during a positive cycle of the modulation waveform, only a transition between the first switching state (P) and the third switching state (L);

18 during a zero crossing point of the modulation waveform, only a transition between the third switching state (L) and the fourth switching state (U); and
during a negative cycle of the modulation waveform, only a transition between the second switching state (N) and the fourth switching state (U).

6. The power converter of claim 2,
wherein each of the horizontal switches comprises at least two switching cells, each of the at least two switching cells of the respective horizontal switch being configured to output a zero and at least a positive voltage.

7. The power converter of claim 3,
wherein each of the horizontal switches comprises at least two switching cells, each of the at least two switching cells of the respective horizontal switch being configured to output a zero and at least a positive voltage.

8. The power converter of claim 4,
wherein each of the horizontal switches comprises at least two switching cells, each of the at least two switching cells of the respective horizontal switch being configured to output a zero and at least a positive voltage.

9. The power converter of claim 5,
wherein each of the horizontal switches comprises at least two switching cells, each of the at least two switching cells of the respective horizontal switch being configured to output a zero and at least a positive voltage.

10. The power converter of claim 6,
wherein the at least two switching cells of the first horizontal switch are arranged in series between the first intermediate node and the AC terminal; and
wherein the at least two switching cells of the second horizontal switch are arranged in series between the second intermediate node and the AC terminal.

11. The power converter of claim 10,
wherein two successive switching cells of the series of the at least two switching cells are configured to switch with a mutual time delay corresponding to a dwell time.

12. The power converter of claim 11,
wherein the switching cells are configured to shape the transition between any two of the main voltage levels of the power converter based on the dwell time.

13. The power converter of claim 11,
wherein the dwell time is the same or is different for two switching cells of the series of the at least two switching cells.

14. The power converter of claim 12,
wherein a branch controller is configured to adjust the dwell time for each switching cell based on a balance of voltages among capacitors in the respective switching cell.

15. The power converter of claim 11, further comprising:
a branch controller configured to provide the switching signal and adjust the dwell time for each switching cell.

16. The power converter of claim 15,
wherein the branch controller is configured to adjust the dwell time for each switching cell based on a balance of voltages among capacitors in the switching cell.

17. The power converter of claim 6,
wherein each of the at least two switching cells comprises at least one main switch, at least one auxiliary switch, and a switching cell capacitor.

18. The power converter of claim 17,
wherein each of the at least two switching cells further comprises a resistor arranged in series with the switching cell capacitor.

19. The power converter of claim 17,
wherein each of the at least two switching cells further
   comprises a resistor arranged in parallel with the
   switching cell capacitor.
20. The power converter of claim 1, further comprising:
a central controller configured to provide switching sig-
   nals, wherein the switching signals comprise pulse
   width modulation, for switching the vertical switches
   and the horizontal switches.

\* \* \* \* \*